(12) United States Patent
Eschbach et al.

(10) Patent No.: US 7,742,200 B2
(45) Date of Patent: Jun. 22, 2010

(54) PRE-PRESS PRODUCTION IMAGE ALERT SYSTEM AND METHOD

(75) Inventors: Reiner Eschbach, Webster, NY (US); Peter Crean, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1564 days.

(21) Appl. No.: 11/032,954

(22) Filed: Jan. 11, 2005

(65) Prior Publication Data

US 2006/0152768 A1    Jul. 13, 2006

(51) Int. Cl.
 *H04N 1/04* (2006.01)
(52) U.S. Cl. ............... 358/474; 358/448; 358/518; 358/1.9; 382/167; 382/274; 382/228; 348/E5.078; 348/224.1
(58) Field of Classification Search ............... 358/474, 358/486, 3.26, 1.9, 1.11, 518, 448, 1.15, 358/1.16; 382/166, 167, 274, 275, 170, 205, 382/226, 228; 348/E5.078, E5.079, 224.1
See application file for complete search history.

(56) References Cited

U.S. PATENT DOCUMENTS

| | | | |
|---|---|---|---|
| 4,590,606 A | 5/1986 | Rohrer | |
| 5,149,977 A | 9/1992 | Mita | |
| 5,347,274 A | 9/1994 | Fuss et al. | |
| 5,357,352 A | 10/1994 | Eschbach | |
| 5,363,209 A | 11/1994 | Eschbach et al. | |
| 5,371,615 A | 12/1994 | Eschbach | |
| 5,410,621 A | 4/1995 | Hyatt | |
| 5,414,538 A | 5/1995 | Eschbach | |
| 5,450,217 A | 9/1995 | Eschbach et al. | |
| 5,450,502 A | 9/1995 | Eschbach et al. | |
| 6,028,676 A | 2/2000 | Nakao | |
| 6,035,072 A | 3/2000 | Read | |
| 6,040,927 A | 3/2000 | Winter et al. | |
| 6,115,509 A | 9/2000 | Yeskel | |
| 6,204,930 B1 * | 3/2001 | Inoue | 358/1.9 |
| 6,297,879 B1 | 10/2001 | Yang et al. | |
| 6,608,926 B1 * | 8/2003 | Suwa et al. | 382/162 |
| 6,628,843 B1 | 9/2003 | Eschbach et al. | |
| 6,771,392 B1 * | 8/2004 | Ebner | 358/3.07 |
| 7,016,079 B2 * | 3/2006 | Sugizaki | 358/1.9 |
| 7,127,100 B2 * | 10/2006 | Wenzel et al. | 382/154 |
| 7,283,683 B1 * | 10/2007 | Nakamura et al. | 382/274 |
| 7,298,927 B2 * | 11/2007 | Nako et al. | 382/298 |
| 7,433,508 B2 * | 10/2008 | Sakai et al. | 382/144 |
| 7,451,390 B2 * | 11/2008 | Itani | 715/234 |
| 2003/0095197 A1 | 5/2003 | Wheeler et al. | |
| 2004/0109596 A1 | 6/2004 | Doran | |

(Continued)

OTHER PUBLICATIONS

NTX Large Format Digital Printing Software; c. 1998 Xerox Corporation; www.colorgrafx.com; 2 pages.

(Continued)

*Primary Examiner*—Negussie Worku
(74) *Attorney, Agent, or Firm*—Duane C. Basch; Basch & Nickerson LLP

(57) ABSTRACT

Disclosed is a method and system for checking and identifying images and other document components that may not be suitably rendered by an output device or process. The method employs a dual-mode analysis of visual image attributes to determine an aggregate confidence while also checking individual image attributes, to determine whether image content requires adjustment prior to being printed or rendered.

19 Claims, 4 Drawing Sheets

U.S. PATENT DOCUMENTS

| | | | |
|---|---|---|---|
| 2004/0169873 A1* | 9/2004 | Nagarajan | 358/1.9 |
| 2004/0212692 A1* | 10/2004 | Nakami et al. | 348/224.1 |
| 2005/0206927 A1* | 9/2005 | Yamada | 358/1.9 |
| 2005/0226503 A1* | 10/2005 | Bailey et al. | 382/173 |
| 2006/0188172 A1* | 8/2006 | Higurashi et al. | 382/275 |
| 2007/0047033 A1* | 3/2007 | Furui | 358/519 |
| 2007/0086674 A1* | 4/2007 | Guan | 382/275 |

OTHER PUBLICATIONS

Howard, Courtney; Electronic Publishing—PreFlight Beyond Print; Electronic Publishing Magazinec. 2004 PennWell Corporation.

* cited by examiner

PRE-PRESS PRODUCTION IMAGE ALERT SYSTEM AND METHOD

Provided herein is an image analysis and alert system, and more particularly a system and method for the analysis and identification of production rendering concerns for documents and associated images.

BACKGROUND AND SUMMARY

The following patents or publications are noted and are hereby incorporated by reference in their entirety:

U.S. Pat. Nos. 5,371,615, and 5,357,352, teach a method and apparatus for image-dependent color shifting in electronic documents of color shifted natural scene images.

U.S. Pat. No. 5,363,209, discloses a method and apparatus for improving the appearance of a digitally encoded image having a pictorial scene, and more particularly, a method for improving sharpness within a digitally encoded image having a pictorial scene.

U.S. Pat. No. 5,347,374, is directed toward a method and apparatus for improving the appearance of a digital image having a pictorial scene, and more particularly, toward improving processing time and image quality of an image which is processed by multiple cascaded processing elements.

U.S. Pat. Nos. 5,450,502, and 5,414,538, teach a method and apparatus for improving the appearance of a digital image having a pictorial scene, and more particularly, a method for improving the contrast within the pictorial screen.

U.S. Pat. No. 5,450,217, discloses a method and apparatus for image-dependent color saturation correction in natural scene color electronic pictures.

U.S. Pat. No. 6,628,843, to Eschbach, et al., issued Sep. 30, 2003 for "Image Enhancement on JPEG Compressed Image Data," teaches a method and apparatus for image enhancement of JPEG compressed image data.

NTX™ Large Format Digital Printing Software, published by Xerox Corporation, © 1998,, which described Xerox ColorgrafX NTX full featured RIP and print software (NTX RIP Software), including automated image quality enhancement.

In production printing, the verification of print data is a common functionality. The pre-press checking tasks include the verification of the existence and accessibility of all document elements, such as fonts and images, the readability of all included formats, etc. An example of such functionality is found in MarkzNet™ as described at http://www.creativepro-.com/story/news/11767.html.

In production printing it remains necessary for the producer to "warrant" the correct reproduction of the user content and data, including images. Current pre-press checking extends to the verification of image sizes and resolutions to warrant print quality. However, it is often the case that images are of poor quality, and despite perfect rendering of the input image data, will lead to customer dissatisfaction, even if the images have the correct format and resolution. Common problems with images that cannot simply be identified by current tools are image defects or artifacts, such as improper exposure, poor color balance and/or saturation, lacking sharpness, and the like. In such cases, re-work and lost profits are the end result as the customer is often not "charged" for the full extent of the costs incurred by the production printing shop. As will be apparent from the following description, the term "image attributes" is used to indicate visual attributes of images, such as sharpness, contrast, color balance, as distinguished from image format attributes that relate to file formats, resolutions, etc.

On the other hand, software products such as Xerox' FreeFlow™, or Xerox DocuSP and print software described above is capable, to a certain extent, for analyzing documents and associated images and to automatically make adjustments in image characteristics (e.g., sharpness, color balance and saturation) to improve poor quality images. The system and method described herein take such functions to a higher level, and include not only the analysis of several image characteristics (edge sharpness, color fidelity, saturation, exposure, contrast) alone and in combination, but also include a more rigorous review of such characteristics to determine if intervention is necessary. Then, if necessary, the system and method enable automated and/or manual intervention in order to assure that the output is likely to be acceptable to the customer. It is understood, that manual operation also preferably includes the case where the user applies or agrees to the processing suggested by the system in the process of analyzing the image data.

The motivation is that in print-for-pay or similar scenarios, an expert intervention is normally desired or required if the print data is to be modified. This is to avoid unintended consequences of automated systems. For example, the "bad image" might have intentionally been bad to contrast it with a "good image" somewhere else in the document. It is therefore required that the intended automatic process is verified with a user and that the user can decide on the processing, based on the severity of the processing. For example, small modifications might always be enabled, large ones might always require user input, and/or based on the user preference and job settings (e.g.: jobs for a specific customer will only create user intervention requests for certain operations, whereas jobs for a different customer will always require intervention for changes).

Disclosed in embodiments herein is a method for processing a document for rendering, comprising the steps of: analyzing the content of the document prior to rendering for at least one image attribute; determining, based upon the analyzing step, a confidence that the rendering of the document will produce a desirable output; based upon the confidence, carrying out an adjustment of the document; and rendering the document. It is to be understood that a document might contain any number of images or image-type objects and that analyzing the document always includes the identification of image-tape objects.

Also disclosed in embodiments herein is a method for analyzing a document prior to rendering to determine a confidence that the document will be correctly rendered, comprising the steps of: analyzing the content of the document prior to rendering for a plurality of image attributes; determining an aggregate confidence that rendering of the document will produce a desirable output, including (a) comparing the image attributes as analyzed to at least a first boundary condition associated with each attribute, such that each comparison produces a result that indicates whether the attribute meets the first boundary condition, and (b) aggregating the results from the step of comparing the attributes to the associated first boundary conditions, and taking the aggregate as an aggregate confidence; comparing the image attributes as analyzed to at least a second boundary condition associated with each attribute, such that each comparison produces a result that indicates whether the attribute meets the second boundary condition; if the aggregate confidence and comparison of image attributes indicates the attributes meet all of the second boundary conditions, rendering the document; and otherwise carrying out an adjustment of the document.

Also disclosed in embodiments herein is a system for processing a document to determine if the document will produce a desired result, comprising: port for receiving document data including image data that represents an input digital image; memory for storing said image data; a processor, capable of accessing said memory, for carrying out an analysis of at least one attribute of the image, said processor further determining, based upon the analysis, a confidence that the rendering of the image data will produce a desirable output; an image adjustment system, responsive to the confidence, for carrying out an adjustment of the image; and an output device for rendering the document.

DETAILED DESCRIPTION

Figure 1:
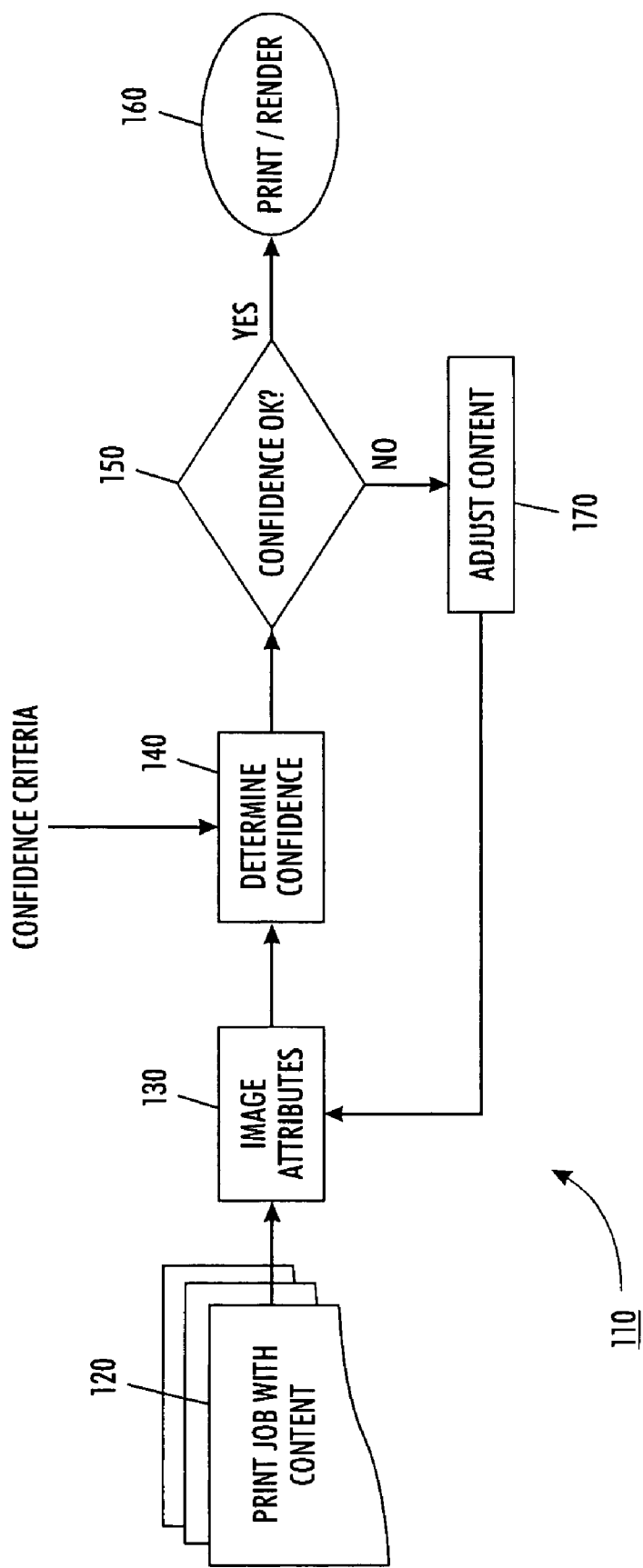
FIG. 1 is a general flowchart illustrating steps in accordance with the disclosed method

The method and system will be described in connection with a preferred embodiment, however, it will be understood that there is no intent to limit the claims to the embodiment described. On the contrary, the intent is to cover all alternatives, modifications, and equivalents as may be included within the spirit and scope of the appended claims.

For a general understanding of the present system and method, reference is made to the drawings. In the drawings, like reference numerals have been used throughout to designate identical elements.

As suggested above, a pre-press analysis of image and other components within a document to be rendered may identify aspects or elements of the document that will not be suitably reproduced. Use of such techniques would enable the "estimation" of a document's image quality upon rendering or printing in order to characterize the confidence that the document will be suitably rendered by an output device or system. Use of a system to characterize the confidence is useful in automated or manual systems intended to catch rendering problems before production runs are initiated, thereby avoiding costly rework.

Referring to FIG. 1, there is depicted a general flow diagram illustrating various aspects of a pre-press document confidence method or process. In the method for processing a document for rendering 110, it is apparent that several steps are employed to render an input print job 120.

As used herein, the reference to a document or print job is intended to include the content and formatting associated with or required for the output of a printed document. It will be appreciated that such information is typically in the form of digital information, and includes content (images, text, etc.) as well as formatting information—perhaps in one of several well-know page or job description formats. As described in the following embodiments, reference to a document is intended to be directed to a document having a combination of text and images arranged therein, but is not intended to be so limited. In other words, the method and system described may be applied to an image(s), a document, and various combinations of renderable components.

Method 110 includes step 130 where the content of the print job or document is analyzed, first to identify if images are present, and then if so, to identify image attributes. Although it will be understood that various methods may be employed to analyze the image content, the present method is directed to portions of the automated image enhancement algorithms that could be represented, for example, in Xerox' DocuSP™ and FreeFlow™ software or similar systems that automatically enhance images for printing. Other examples of an automated image enhancement operation are found in U.S. Pat. Nos. 5,371,615, 5,357,352, 5,363,209, 5,347,374, 5,450,502, and 5,450,217, to Eschbach, et al., which were previously incorporated by reference for their teachings. The output of any of the image attributes steps is a characterization of one or more visual image attributes. The visual image attributes include, but are not limited to, edge sharpness, color fidelity, saturation, exposure, contrast, and whether any defects are detected in the image data, such as compression artifacts or color mapping artifacts.

Figure 2:
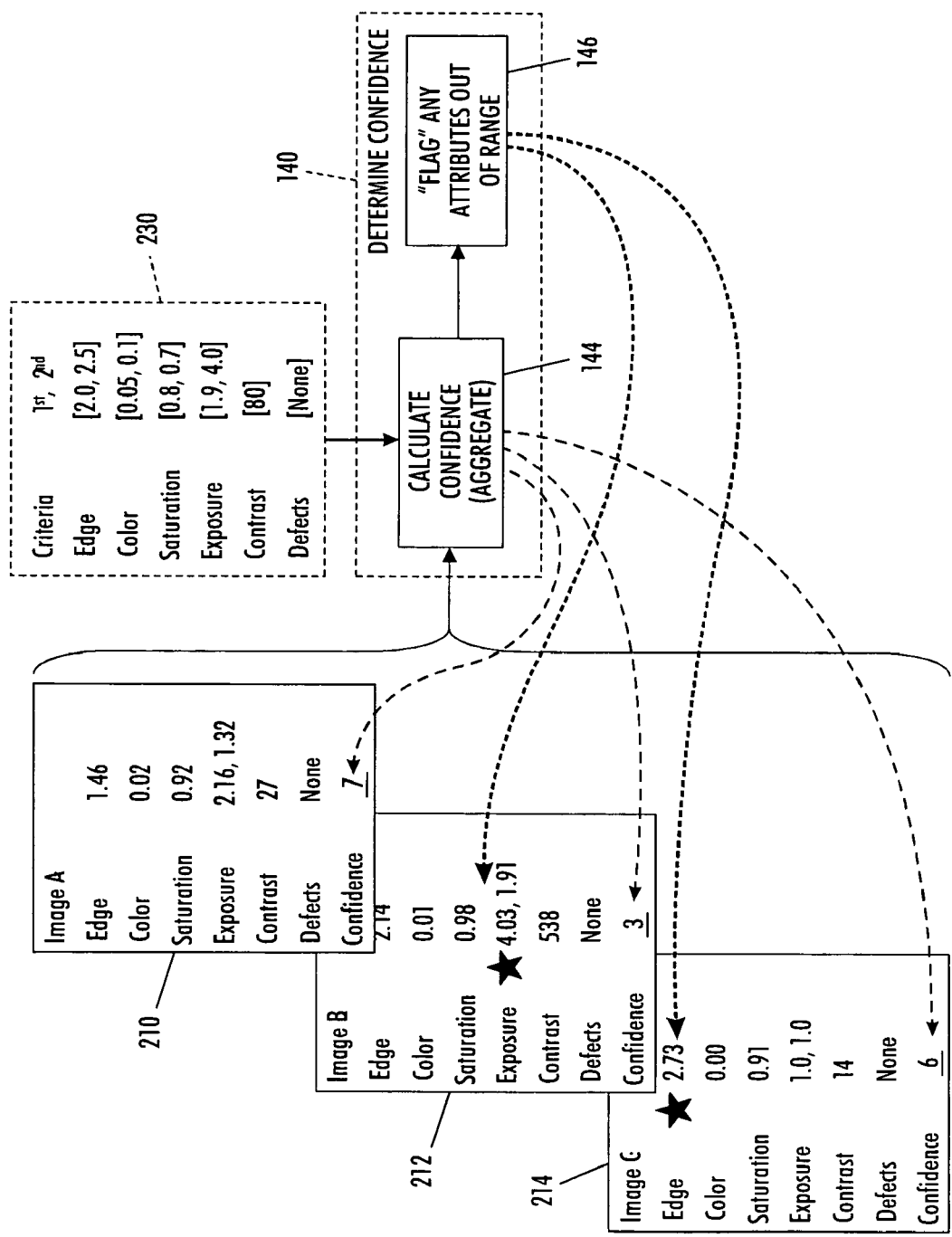
FIGS. 2 and 3 are further detailed illustrations of steps carried out in the flowchart of FIG. 1.

As illustrated, for example in FIG. 2, the step of analyzing the content of the document and identifying image attributes prior to rendering, step 130, returns the attributes and the associated measure or value quantifying each attribute. Subsequently, at step 140, results of the image attributes step are used to determine a confidence that the rendering of the document will produce a desirable output. The confidence determination is a function of the identification and analysis of the image(s) as well as at least one boundary condition for each attribute, represented in FIG. 1 as the "confidence criteria." Based upon the confidence, as tested at step 150, the method either directs the system to initiate rendering or printing of the image, step 160. Alternatively, in the event that the confidence is unacceptable, indicating a likelihood of a rendering problem, the unacceptable content may be adjusted at step 170.

Adjustment step 170 may be accomplished either by manual intervention and adjustment of the image attributes, perhaps by a pre-press operator or other skilled individual, and perhaps using the suggested modifications by the examining system. It is also contemplated, however, that the image data may be automatically adjusted using a known image enhancement process, for example, those outlined in the patents and publications cited above. It is also contemplated that the system might change between automatic, semi-automatic and manual adjustment based on the severity of the expected rendering problem, other image attributes, such as image relevance or by user preferences and settings.

As will be appreciated, method 110 may operate to analyze one or a plurality of image attributes. Moreover, the use of multiple attributes is likely to result in an improved confidence determination as it takes into account various attributes that would impact the rendering of the image. Thus, the method intentionally contemplates deriving image confidence levels as a function of a plurality of image attributes.

As noted above, the method uses one or more known image analysis tools to characterize the image attributes. Such techniques are known and have been described, for example, in:

Printing images from the WEB, Reiner Eschbach, Invited Paper, Internet Imaging II, IS&T/SPIE Electronic Imaging 2001,, January 2001,, San Jose, Calif.;

Automatic Processing of Document Images, Invited Paper, Eurographics '99, September 1999,, Milano, Italy;

Automatic Processing of Color Images for User Preference, Reiner Eschbach, IS&T/SPIE Electronic Imaging 1999,, January 1998,, San Jose, Calif.;

Conditional Post-Processing of JPEG Compressed Images, Reiner Eschbach, Annual Meeting IS&T, Mai 1997,, Boston;

Global Luminance Enhancement Based on Local Measurements, William Fuss, Reiner Eschbach and Brian Waldron, IS&T Annual Meeting, May 1994, Rochester, N.Y.;

Hence, the method may employ an automatic image enhancement system to analyze the content for at least one image attribute.

In another embodiment, the confidence may be determined as an aggregate of image attributes. In other words, the confidence is determined as a function of the comparison of a plurality of image attributes against a plurality of ranges or bounds within which the attribute should fall in order to be suitable for rendering. This feature is described in further detail relative to FIGS. 2 and 3.

Figure 3:
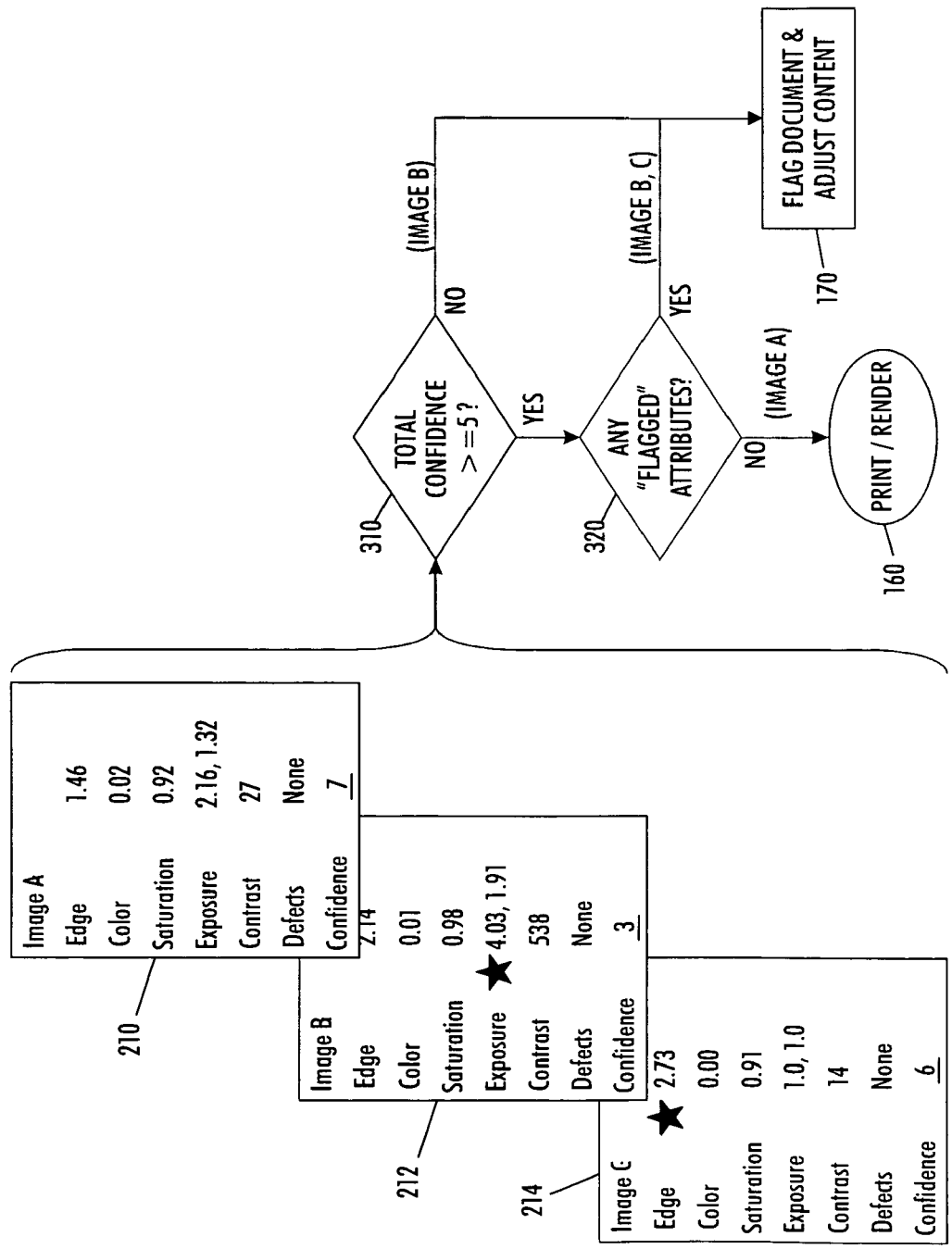

Turning now to FIGS. 2 and 3, there are shown particular details related to steps 130, 140 and 150 of FIG. 1. More specifically, step 130 produces data in the nature of that reflected by the data in items or tables 210, 212 and 214 of FIG. 2. The data for each of the three respective images is represented in table format, with the image attribute along the left side and the associated value of the attribute for that image along the right side. It will be appreciated that a pair of values are returned for the exposure attribute. The confidence determining step 140 is further split into substeps 144 and 146, where the image analysis results are processed.

First, in substep 144, the various attributes are compared against a boundary value for the attribute as stored in the criteria data 210. For example, the color attribute for each image is compared against the lower (or first) color boundary or threshold of 0.05. If the color attribute is less than or equal to the boundary value, then the criteria is met and a confidence of one is assigned for that attribute. Otherwise a confidence of zero is assigned. At the same time, or at a later time, the attribute is also checked to determine if it is outside of an outer reproducible range, as reflected by the secondary boundary for each of the criteria.

Again, looking at the color attribute, the second boundary condition is 0.1,, and any color attribute value exceeding this level would result in a "flag" being set for that attribute by substep 146. Thus, the confidence determination may be a combination of not only the attribute levels compared to a set of first boundary criteria, but also may include a secondary analysis relative to a secondary boundary, where the secondary boundary may be indicative of an undesirable rendering capability. In this manner, the confidence is more robust, and would not permit rendering of an image even though all but a single attribute met the criteria for rendering. As reflected in FIG. 2, substep 144 determines, based upon the first boundary condition, the number of attributes meeting the boundary criteria, and sums them to provide an aggregate confidence level shown at the bottom of each of the image data sets 210, 212 and 214. Substep 146, as described above, "flags" any attributes that are outside of the secondary boundary condition, and those attributes are illustrated by the presence of a star next to the attribute value (see, data sets 212 and 214, for images B and C, respectively.

Having described the details of FIG. 2, attention is turned to FIG. 3, where the resulting image data sets are interrogated at steps 310 and 320, to determine if the images are suitable for rendering. As described above, the aggregate confidence level is compared against a predefined boundary (see criteria 230), and confidence values of five or greater are defined as meeting the criteria and suitable for further review. Step 320 further identifies those images having one or more attribute levels that are outside of the secondary boundary condition, and thus characterizing them as being likely to result in an undesirable rendering. In either case, as described with respect to FIG. 1 and in step 170, images having a low confidence or outlying attribute levels may be adjusted using manual or automated means to correct the image. Otherwise, the images are indicated as being likely to be suitably rendered and are passed to printing/rendering step 160.

As set forth herein, the confidence may be determined by comparing the image attributes as analyzed to at least one boundary condition associated with each attribute, such that each comparison produces a result that indicates whether the attribute meets the boundary condition. Although the confidence is characterized as a sum of the boundary comparisons, it is possible that alternative means for calculating confidence may be employed, including averaging or weighted averaging where particular attributes are provided greater weight than others. Here again, depending upon the manner in which the aggregate confidence is determined, differing predefined confidence criteria may be employed to characterize whether an image is likely to be properly rendered. It should be further appreciated that a certain amount of empirical data may be employed in setting the confidence boundary or threshold.

Furthermore, as described relative to FIGS. 2 and 3, the confidence may be an overall confidence determined by first comparing the image attributes as to a first boundary condition associated with each attribute (indicating whether the attribute meets the first boundary condition) and by comparing the image attributes to a second boundary condition to indicate whether the attribute meets the second boundary condition. Moreover, the results of the first comparison may be aggregated and taken as confidence, unless at least one of the results exceeds the second boundary condition—which would effectively reset the confidence level to a zero.

Having described the method of processing a document or image to determine if the document will produce a desired result when rendered, attention is now turned to a system suitable for executing the aforedescribed steps. Although an embodiment will be described, it should be appreciated that various systems and configurations thereof may be employed to accomplish the methods and steps described.

Figure 4:
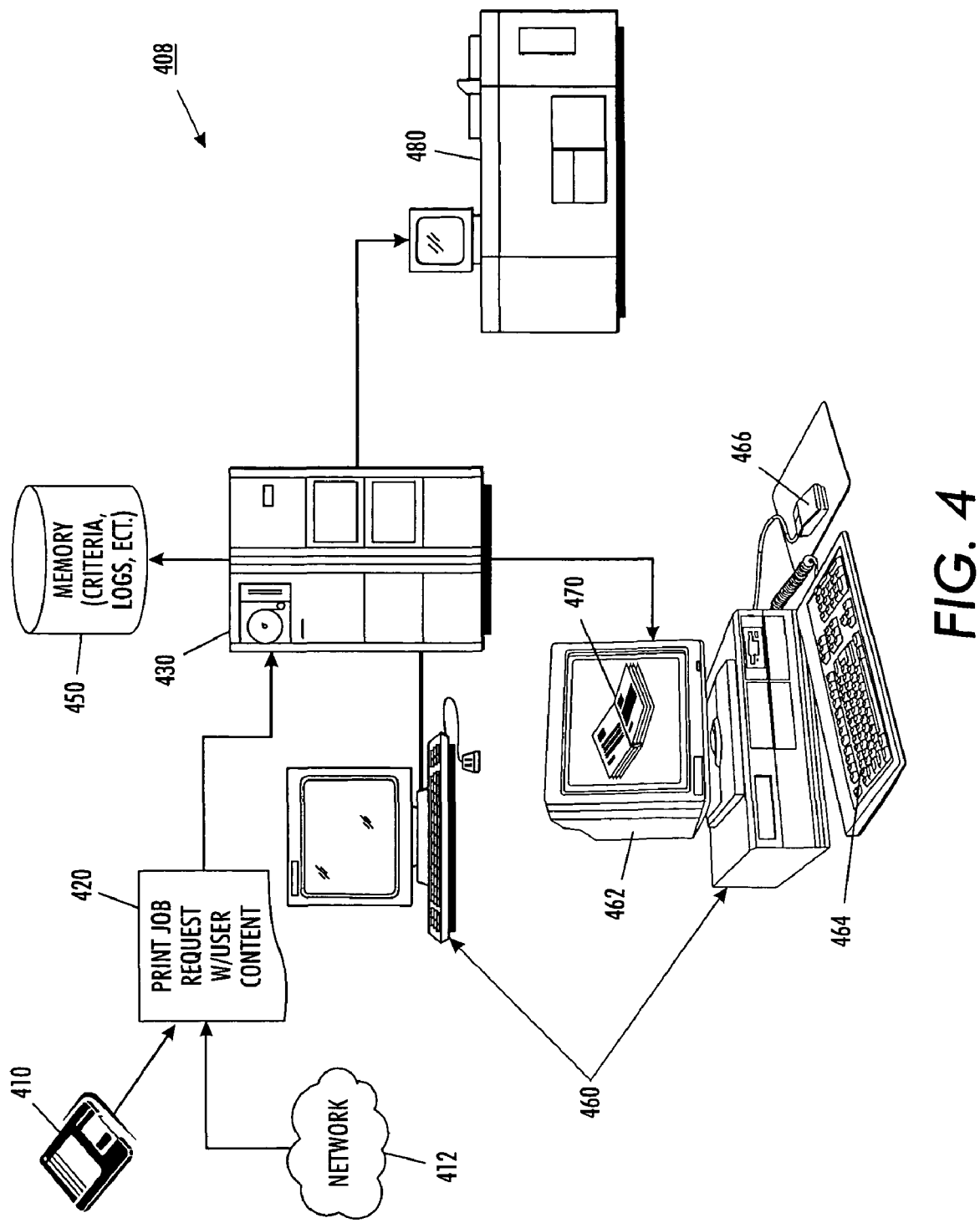
FIG. 4 is an illustrative example of a system suitable for carrying out one or more steps of the process depicted in FIGS. 1 through 3.

Turning to FIG. 4, there is illustrated a system 408 for processing a document input in a digital form via media such as a disk or CD 410 or via a network 412. The document, indicated as print job 420, is used as the input to determine whether a desired result is capable of being printed. The system includes a ports such as a communications port or media reader (e.g. network card, modem, I/O port, disk or CD drive, etc.) for receiving document data including image data that represents an input digital image. Such means may also include a workstation or raster processor associated with an image output device, or it may include a networked server 430 or similar processor or processing hardware suitable for receiving document data from a multitude of sources and media. In one embodiment, document information may be stored, at least temporarily, on a mass storage or memory device 450. The workstation or server 430 would include a processor capable of accessing the memory 450, and for carrying out an analysis of at least one attribute of the image under the control of program code or software. The processor would also include additional programmable functionality so as to further determine, based upon the analysis, a confidence that the rendering of the image data will produce a desirable output in the manner described above.

Depending upon the result of the analysis and confidence determinations, the system might also include a user workstation 460 or similar auxiliary processing means that would automatically, or under the control of a user (via interface devices such as a monitor 462, keyboard 464 and mouse 466), perform adjustments to one or more images in the document so as to place the document in a form suitable for successful rendering by a production print system 480 or similar output device.

As noted above, the processor derives image confidence levels as a function of image attributes, and these attributes may be at least temporarily stored in memory 450. Moreover, the workstation 460 may be employed to adjust the image 470 or to modify the content for at least one image so as to improve any attributes for which the image was flagged, or to improve the confidence level for one or more attributes.

To facilitate operation and control of the system 408, various programmatic controls and tracking or logging features may be employed, the administration of which may be handled by a report generation feature of system 408 (e.g., running on server 430). In particular, should the system be used for automated adjustment of images that have low confidence or flagged attributes, the results of such analysis, as well as any adjustments, should be recorded in a log or similar means for tracking the operations performed. In this way, a user may later review the information to determine what was done or the extent of any changes or adjustments made to the images or other content.

Although described relative to document images, it is to be further understood that the method and system described herein may be applied to other visual attributes of the image-type objects of the document, for example, the color smoothness of sweeps. In other words, the method and system are particularly applicable to advanced visual attributes, and are not limited to the typical format analysis of traditional pre-press checking systems. Hence, the described method and system contemplate the detection, and correction, of more complex aspects of document rendering—including image defects or artifacts, improper exposure, poor color balance and/or saturation, lack of sharpness, and the like.

It is, therefore, apparent that there has been described, in accordance with the present application, a method and system for checking and identifying images and other document components that may not be suitably rendered by an output device or process. While the method and system have been described in conjunction with preferred embodiments thereof, it is evident that many alternatives, modifications, and variations will be apparent to those skilled in the art. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for processing a document stored in memory for rendering, comprising:
    analyzing, using a processor, at least a portion of the content of the document stored in memory, prior to rendering, for at least one visual image attribute;
    determining, based upon the analyzing, a confidence that the rendering of the document will produce a desirable output; and
    based upon the confidence, carrying out an adjustment of the document stored in memory; and rendering an adjusted document.

2. The method of claim 1, wherein carrying out an adjustment of the document is completed manually using a workstation interface.

3. The method of claim 1, wherein carrying out an adjustment of the document is carried out automatically by a processor.

4. The method of claim 1, wherein analyzing includes examining the document for a plurality of visual image attributes.

5. The method of claim 4, wherein determining the confidence further includes deriving image confidence levels as a function of the visual image attributes.

6. The method of claim 1, wherein analyzing employs an automatic image enhancement system to analyze the content for at least one visual image attribute.

7. The method of claim 1, wherein the confidence is a function of at least one individual visual image attribute.

8. The method of claim 1, wherein the confidence is a function of an aggregate of a plurality of visual image attributes.

9. The method of claim 8, wherein the confidence is determined by comparing the visual image attributes, as analyzed, to at least one boundary condition associated with each attribute, such that each comparison produces a result that indicates whether the attribute meets the boundary condition.

10. The method of claim 9, wherein the number of visual image attributes producing results within the boundary conditions is an indication of the confidence, and where the step of carrying out an adjustment of the document based upon the confidence, includes comparing the confidence against a predefined level.

11. The method of claim 9, wherein the confidence is an overall confidence determined by a method comprising:
    (a) comparing the visual image attributes as analyzed to at least a first boundary condition associated with each attribute, such that each comparison produces a result that indicates whether the attribute meets the first boundary condition;
    (b) comparing the visual image attributes as analyzed to at least a second boundary condition associated with each attribute, such that each comparison produces a result that indicates whether the attribute meets the second boundary condition; and
    (c) aggregating the results from the step of comparing the attributes to the first boundary conditions, and taking the aggregate as the confidence unless at least one of the results from the step of comparing the attributes to the second boundary conditions exceeds the boundary condition and then resetting the confidence level.

12. A method for analyzing a document stored in memory prior to rendering to determine a confidence that the document will be correctly rendered, comprising:
    analyzing, using a processor, at least a portion of the content of the document stored in memory prior to rendering, and for each image identified in the document characterizing a plurality of visual image attributes;
    determining an aggregate confidence that rendering of the document will produce a desirable output, including
        (a) comparing the visual image attributes as analyzed to at least a first boundary condition associated with each attribute, such that each comparison produces a result that indicates whether the attribute meets the first boundary condition, and
        (b) aggregating the results from the step of comparing the attributes to the associated first boundary conditions, and taking the aggregate as an aggregate confidence;
    using the processor, comparing the visual image attributes as analyzed to at least a second boundary condition associated with each attribute, such that each comparison produces a result that indicates whether the attribute meets the second boundary condition; and
    if the aggregate confidence and comparison of visual image attributes indicates the attributes meet all of the second boundary conditions, rendering the document; and otherwise carrying out an adjustment of the document stored in memory prior to rendering an adjusted document.

13. The method of claim 12, wherein carrying out an adjustment of the document is completed manually using a workstation interface.

14. The method of claim 12, wherein carrying out an adjustment of the document is carried out automatically by a processor.

15. A system for processing a document to determine if the document will produce a desired result, comprising:
 a port for receiving document data, including image data that represents an input digital image;
 memory for storing said image data;
 a processor, capable of accessing said memory, for carrying out an analysis of at least one visual attribute of the image, said processor further determining, based upon the analysis, a confidence that the rendering of the image data will produce a desirable output;
 an image adjustment system, responsive to the confidence, for carrying out an adjustment of the image; and
 an output device for rendering the document.

16. The system of claim 15, wherein the processor derives image confidence levels as a function of visual image attributes stored in said memory.

17. The system of claim 15, wherein said image adjustment system modifies the content for at least one image.

18. The system of claim 15, further including a report generator to provide a log entry stored in said memory, for tracking of the visual image attributes, and recording of actions relative to confidence determinations and automated image adjustment.

19. The system of claim 15, wherein the confidence is determined by comparing the visual image attributes to at least one boundary condition stored in said memory, such that the comparison produces a result that is also stored in said memory.

* * * * *